UNITED STATES PATENT OFFICE.

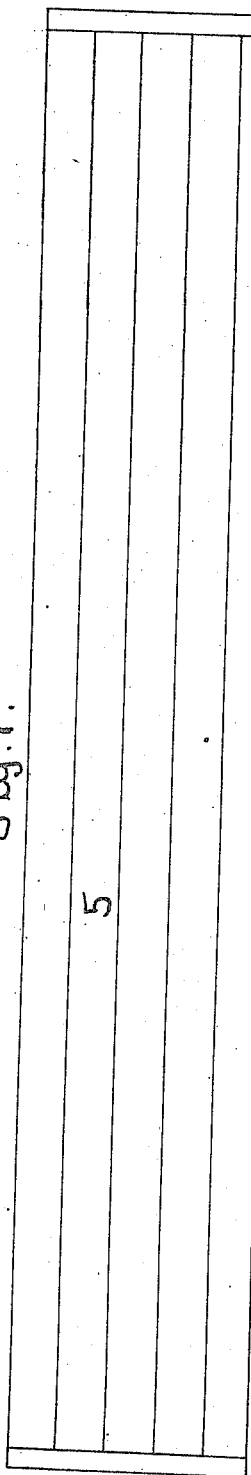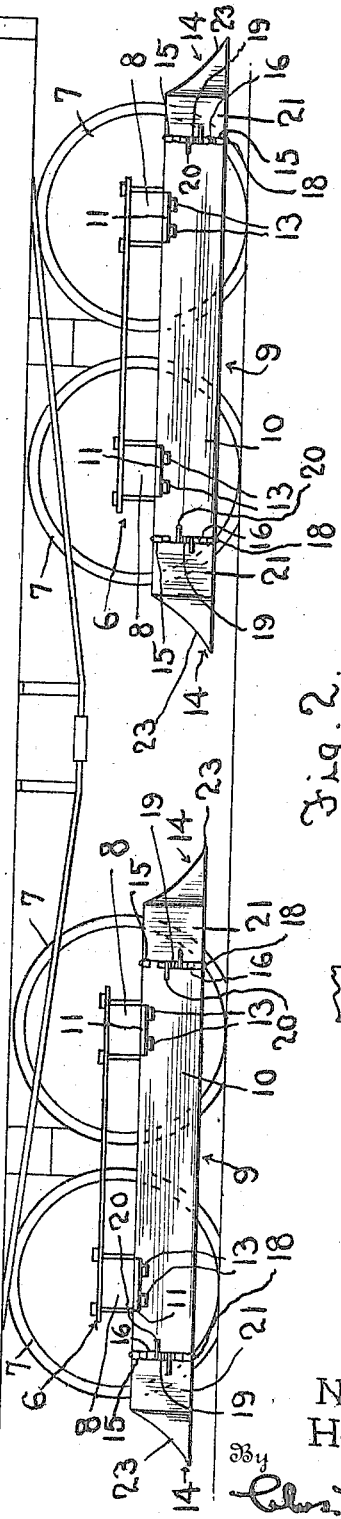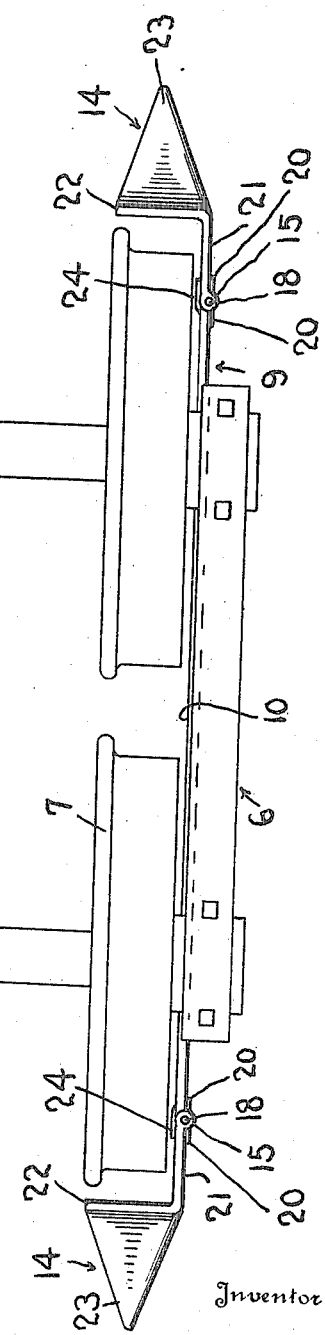

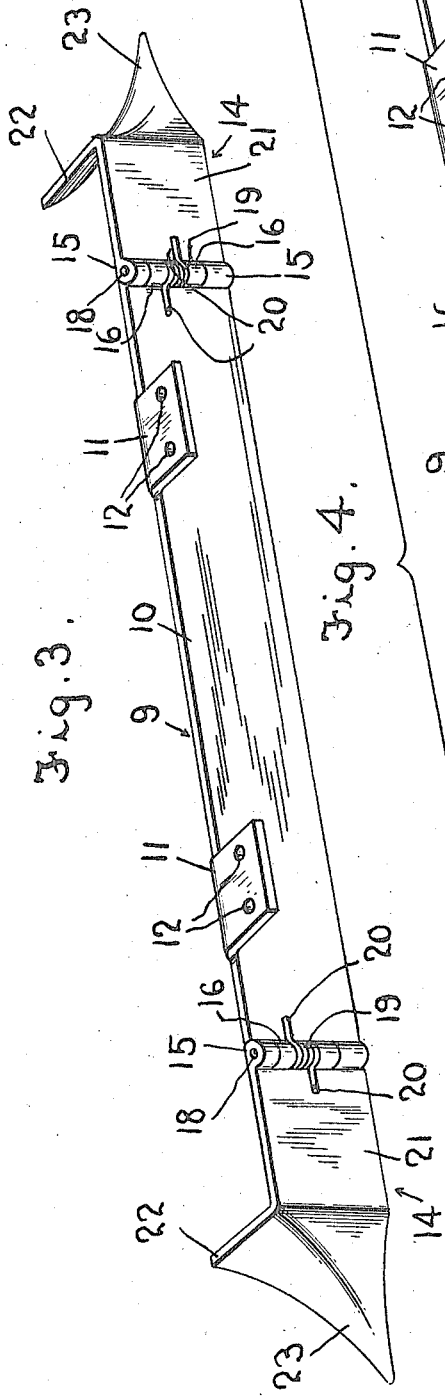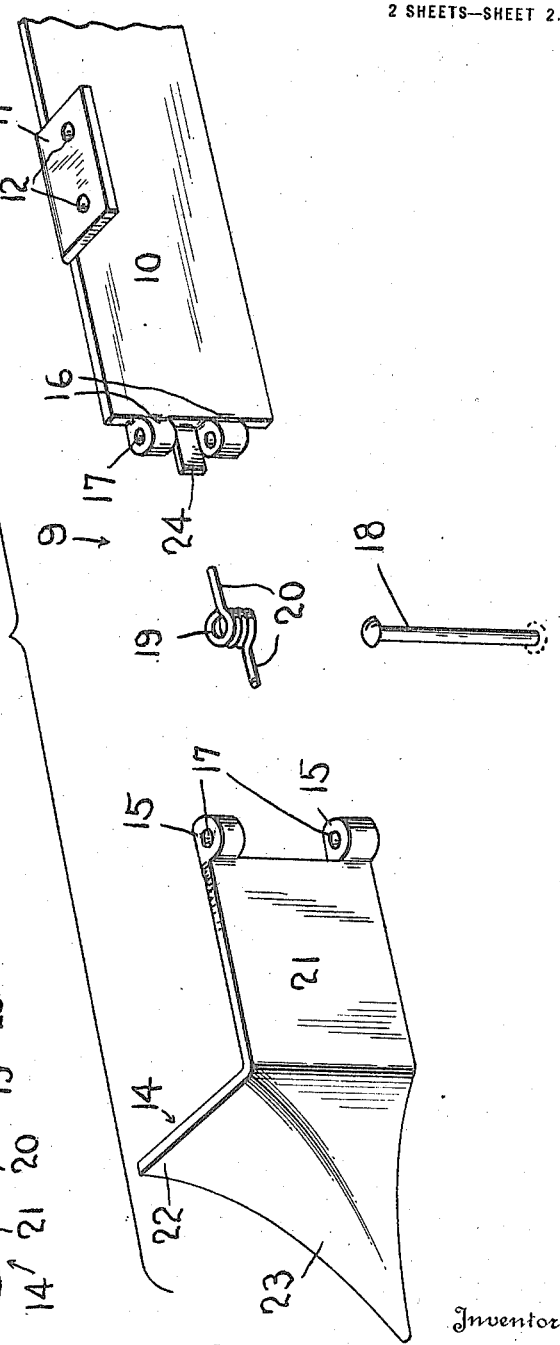

NORMAN MILLER AND HENRY B. IRVIN, OF DURANT, OKLAHOMA.

CAR-FENDER.

1,264,203. Specification of Letters Patent. Patented Apr. 30, 1918.

Application filed August 26, 1916, Serial No. 117,088. Renewed September 10, 1917. Serial No. 190,659.

*To all whom it may concern:*

Be it known that we, NORMAN MILLER and HENRY B. IRVIN, citizens of the United States, residing at Durant, in the county of Bryan and State of Oklahoma, have invented certain new and useful Improvements in Car-Fenders, of which the following is a specification.

The present invention relates to new and useful improvements in fenders and especially that class adapted for application upon railway cars, street cars, and the like.

One object of the invention is the provision of a fender in which the end members thereof can be moved from in the front or rear of the wheels, thereby permitting the use of the pinch bar or the like for the purpose of moving the cars.

Another object of the invention is the provision of means whereby the said fender can be attached for ready removal to the hubs of the wheels and retained in normal position against the outer sides of the wheels and extending in the front and rear thereof.

A further object of the invention is to improve and simplify devices of this character, rendering them comparatively simple and inexpensive to manufacture, reliable and readily operated.

With the above and other objects in view, the present invention resides in the novel features of construction, formations, combinations and arrangements of parts, to be hereinafter more fully described, claimed and illustrated in the accompanying drawing forming a part of the present application, and in which:

Figure 1 is a side elevation of a car showing the same in conventional form with the fenders applied thereto;

Fig. 2 is a plan view of a portion of the truck showing the fender applied;

Fig. 3 is a perspective view of the fender removed; and

Fig. 4 is a view illustrating one end of the fender with the parts thereof in separate positions.

Referring now to the accompanying drawings by corresponding references throughout the several views, the numeral 5 designates generally a conventional form of car mounted on the usual front and rear trucks 6 which carry the carrier wheels 7 including the journal boxes 8.

The fender is indicated at 9 and consists preferably of a side plate 10 from the upper edge of which projects lateral flanges 11, spaced a distance apart equal to the distance of the journal boxes 8 of the several trucks. The flanges 11 are preferably perforated as at 12 providing means whereby the bolts 13 or other suitable fastenings can be employed to attach the fender 9 to the trucks with the plates 10 parallel and in spaced relation from the outer surface of the wheels.

The sections 14 are pivotally connected to the terminals of the plate 10 and are provided with ears 15 which coöperate with the ears 16 formed upon the ends of the plate 10. These ears 15 and 16 are formed with alining openings 17 through which a bolt or other suitable fastening devices 18 can be passed for pivotally connecting the members 10 and 14.

A spring 19 is wound upon the intermediate portion of the bolt 18 and has its ends 20 disposed in engagement with the upper sides of the plate 10 and member 14 respectively for the purpose of yieldingly forcing the member 14 inwardly to the position shown in Figs. 1, 2 and 3.

The member 14 consists of a side plate 21 arranged in the same plane as the plate 10 and lateral extensions 22 are extended in the front and the rear of the wheels 7 thereby providing a fender which will fulfil all of the necessary and desired purposes.

The extensions 22 are preferably tapered forward as at 23 for a purpose which will be apparent to others skilled in the art.

When it is desired to move the car by means of a pinch bar or the like, the members 14 are swung outwardly upon their pivots 18, against the tension of the springs 19, after which the said pinch bar can be used in the usual manner.

From the foregoing description taken in connection with the accompanying drawing, it will be manifest that a car fender is provided which will fulfil all of the necessary requirements of such a device, and it should be understood in this connection that various minor changes in the specific details of construction can be resorted to in the scope of the appended claims without departing from the spirit or sacrificing any of the advantages of the invention.

Having thus described the invention what I claim is:

1. In a fender, a side bar, end members pivotally connected to the side bar, and means for holding the end members in normal position.

2. In a fender, a side bar, attaching flanges formed thereon, end members pivoted to the ends of the side bar, and springs engaging adjacent portions of the side bars and end members for yieldingly retaining the latter in normal position.

3. In a fender, the combination of a side bar, flanges formed thereon and forming attaching means, ears formed upon the ends of the side bar, end members including side plates and lateral extensions, ears formed upon the end members, a fastening element passing through the ears formed upon the side members and end members, and a spring wound upon the fastening element and extending to engage adjacent portions of the side bar and end members for retaining the latter in normal position.

4. In a car fender, a side bar, attaching flanges formed upon the upper edge thereof and extending laterally therefrom, spaced ears formed upon the ends of the side bar, end members including side plates and lateral extensions, said lateral extensions being enlarged and tapered, ears formed upon said end members in alinement with the ears formed upon the said bars, pivoted members passing through said ears, and a spring wound upon the pivoted member between the inner of said ears and having its terminals extended to engage adjacent portions of the said bar and end members yieldingly holding the latter in normal position with their side plates in the same plane as the side member of said fender.

In testimony whereof we affix our signatures in the presence of two witnesses.

NORMAN MILLER.
HENRY B. IRVIN.

Witnesses:
W. M. WARMACK,
J. WINFIELD SCOTT.

Copies of this patent may be obtained for five cents each, by addressing the "Commissioner of Patents, Washington, D. C."